(12) United States Patent
Lee et al.

(10) Patent No.: US 8,336,098 B2
(45) Date of Patent: Dec. 18, 2012

(54) METHOD AND APPARATUS FOR CLASSIFYING HARMFUL PACKET

(75) Inventors: HoSug Lee, Hwaseong-si (KR); Myeong-seok Kim, Daejeon-si (KR)

(73) Assignee: Sysmate Co., Ltd., Daejeon-si (KR)

( * ) Notice: Subject to any disclaimer, the term of this patent is extended or adjusted under 35 U.S.C. 154(b) by 932 days.

(21) Appl. No.: 12/410,975

(22) Filed: Mar. 25, 2009

(65) Prior Publication Data

US 2010/0251364 A1   Sep. 30, 2010

(51) Int. Cl.
*G06F 11/00* (2006.01)
(52) U.S. Cl. ............... 726/22; 726/23; 726/24; 726/25
(58) Field of Classification Search ............ 726/22, 726/23, 24, 25
See application file for complete search history.

(56) References Cited

U.S. PATENT DOCUMENTS

| | | | |
|---|---|---|---|
| 7,424,744 B1 * | 9/2008 | Wu et al. | 726/23 |
| 2004/0107361 A1 * | 6/2004 | Redan et al. | 713/201 |
| 2005/0286522 A1 * | 12/2005 | Paddon et al. | 370/389 |
| 2006/0085855 A1 * | 4/2006 | Shin et al. | 726/23 |
| 2008/0077705 A1 * | 3/2008 | Li et al. | 709/236 |
| 2008/0120721 A1 * | 5/2008 | Moon et al. | 726/23 |

FOREIGN PATENT DOCUMENTS

| | | |
|---|---|---|
| KR | 10-2004-0099864 A | 12/2004 |
| KR | 10-2006-0034581 A | 4/2006 |
| KR | 10-2006-0063564 A | 6/2006 |
| KR | 10-0770357 B1 | 10/2007 |

* cited by examiner

*Primary Examiner* — Harunur Rashid
(74) *Attorney, Agent, or Firm* — Rothwell, Figg, Ernst & Manbeck, P.C.

(57) ABSTRACT

A network apparatus and method of classifying received packets in a security system, the method comprises parsing a received packet and extracting a payload from the parsed packet; scanning the payload to check whether or not a predetermined signature code is included in the payload; if it is determined from the result of the scanning that the predetermined signature code is included in the payload, generating a presumptive signature based on information included in the predetermined signature code; and determining whether or not the generated presumptive signature is identical with a signature corresponding to the predetermined signature code, and allocating an classification identifier (ID) to the received packet according to the result of the determination, thereby classifying the received packet according to the classification ID, wherein the predetermined signature code is formed by a part of the signature corresponding to the signature code.

10 Claims, 5 Drawing Sheets

| Signature | Signature Code |
|---|---|
| Subject:Re:Incoming Fax | ing Fax |
| Subject:Re:Message Notify | Notify |
| RGlyZWNOb3J5QQAAuQJXcmlOZUZpbGUAOwJsc3Ry | JxcmlOZ |
| RPtR7NA7UezQO1HsODtR7NA7kezQGNYoEBtR7NAEWehQOxHsOAqQbVA | RPtR7NA7 |
| ⋮ | ⋮ |

~200

| Signature Code | Identification Information |
|---|---|
| Ing Fax | 100 |
| Notify | 101 |
| Jxcm1OZ | 102 |
| RPtR7NA7 | 103 |
| ⋮ | ⋮ |

| Identification Information | Signature |
|---|---|
| 100 | Subject:Re:Incoming Fax |
| 101 | Subject:Re:Message Notify |
| 102 | RGlyZWNOb3J5QQAAuQJXcmlOZUZpbGUAOwJsc3Ry |
| 103 | RPtR7NA7UezQO1HsODtR7NA7kezQGNYoEBtR7NAEWehQOxHsOAqQbVA |
| ⋮ | ⋮ |

~600

METHOD AND APPARATUS FOR CLASSIFYING HARMFUL PACKET

BACKGROUND

1. Field

The following description relates to a network apparatus, and more particularly, to a network apparatus for classifying received packets based on a predetermined standard.

2. Description of the Related Art

With the recent introduction and development of new protocols and applications, the variety and scope of the Internet and network environments have been incomparably increasing. Due to the rapid worldwide expansion of network access, the network environments are exposed to various security threats internally and externally, and a violation and attack on an information system becomes more sophisticated to deal with. Such a malicious access to a system is attempted to manipulate, alter, and leak data, causing a diversity of legal problems.

The target of attack is changed from particular and special information systems to many and unspecified information systems, the range of attack expands to the entire network on purpose to neutralize the network and cut off the network service, and more intelligent techniques are involved with such violations. Moreover, since anyone who accesses the Internet can share the information publicized on the Internet on a global scale and there are uncensored an enormous number of bulletin board systems and data exchange methods over the Internet, new hacking tools and methods are easily spread, which help mass-produce similar types of hackers.

To protect a network from the evolving violation and attack, a variety of studies have been being conducted, and there have been made a number of attempts to develop security solutions. The examples of primary security systems among the developed security solutions may include a Firewall, an intrusion detection system (IDS), an intrusion prevention system (IPS), etc. The security system monitors transmission/receipt traffics according to security standards, blocks inappropriate access or traffics, detects, analyzes and processes harmful traffics, such as attack attempts or unauthorized actions, by use of traffic monitoring and attack pattern analysis, and then notifies an administrator of the processing result.

Such the security system can be implemented in a software manner based on a strong processor, and deal with change of various and intelligent attacks. However, the network speed increases with the development and expansion of the network environments, and hence, security systems are also required to have high-speed performance and accuracy.

There have been difficulties of improving speed and accuracy of software based security methods, which cannot catch up with the speed of network development. To overcome such problems, it has been discussed that security tasks in software can be offloaded to hardware which substantially affects on the security performance and accuracy.

A security system is required to analyze and process packets in real-time upon being attacked such as to improve its performance and precision of violation detection. Many of network security systems use a signature-based packet detection method. In the signature-based packet detection method, previously-known attacks are analyzed, signatures are generated for identifying attacking packets, based on the analysis result, and the generated signatures are compared to all packets input to a network so as to detect an attack and violation.

The primary function of the signature-based attack detection method is to search a packet payload for a signature. In signature search, all packets are compared to a plurality of previously stored signatures, and thus a significant amount of system resources are used and the overall system performance is affected by the number and size of the signatures. To overcome such drawbacks, new researches and methods for the signature search function are necessary.

The conventional hardware-based methods for signature search include a one-to-one comparison method which compares every input payload with each signature in a signature table, a comparison method utilizing a hash, and a comparison method which divides a signature in a particular length. The combination of these methods may be used.

However, the one-to-one comparison method takes too much time for comparison and experiences performance degradation if the signature is long. The hash utilizing method may encounter a hash collision problem. Furthermore, in the comparison method by dividing the signature into a given length, there may be an error in comparison results that even when the result of comparison shows that all divided parts are matched with parts of a payload, the divided parts may not be from the same signature, and thus the accuracy cannot be guaranteed. In addition, since comparison data of a specific divided part are possibly applied to several signatures, further search and comparison of signatures is required, and thus procedures are complicated to perform. Moreover, if the length of the signature increases, the amount of data to be compared is increased, thereby degrading the performance.

SUMMARY

There is disclosed a method and apparatus for classifying received packet by searching signatures in a hardware manner.

Also, there is disclosed a method and apparatus for classifying packets accurately at high speed.

According to an aspect, there is disclosed a method of classifying received packets in a security system, the method comprising parsing a received packet and extracting a payload from the parsed packet, scanning the payload to check whether or not a predetermined signature code is included in the payload, if it is determined from the result of the scanning that the predetermined signature code is included in the payload, generating a presumptive signature based on information included in the predetermined signature code, and determining whether or not the generated presumptive signature is identical with a signature corresponding to the predetermined signature code, and allocating an classification identifier (ID) to the received packet according to the result of the determination, thereby classifying the received packet according to the classification ID, wherein the predetermined signature code is formed by a part of the signature corresponding to the signature code.

The method of classifying the received packets may further comprise extracting a part of each signature by which the signature is identified from other signatures, and setting the extracted part as a signature code of the signature and storing the signature code.

Identification information may be set for each signature code, and the generating of the presumptive signature may comprise obtaining configuration and size information of the signature corresponding to the predetermined signature code from pre-stored information based on identification information of the predetermined signature code, and generating the presumptive signature by combining pieces of data which are extracted from the payload based on the obtained information.

According to another aspect, there is provided an apparatus for classifying received packets, comprising a packet receiving unit receiving a packet, a packet parsing unit parsing the received packet and extracting a payload from the packet, a signature storing unit storing pre-set signatures, a signature code storing unit storing a plurality of signature codes, each of which is formed by a part of the individual stored signatures, the plurality of signature codes being differentiated from one another in accordance with the stored signatures, a scanning unit scanning the payload to check whether any one of the stored signature codes is included in the parsed payload, a presumptive signature generating unit generating a presumptive signature based on a signature code included in the payload, according to the result of the scanning, and a control unit comparing the presumptive signature with a signature corresponding to the signature code included in the payload and outputting the result of the comparison.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 6 illustrates an example of a signature table including signatures and identification information allocated to each signature.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
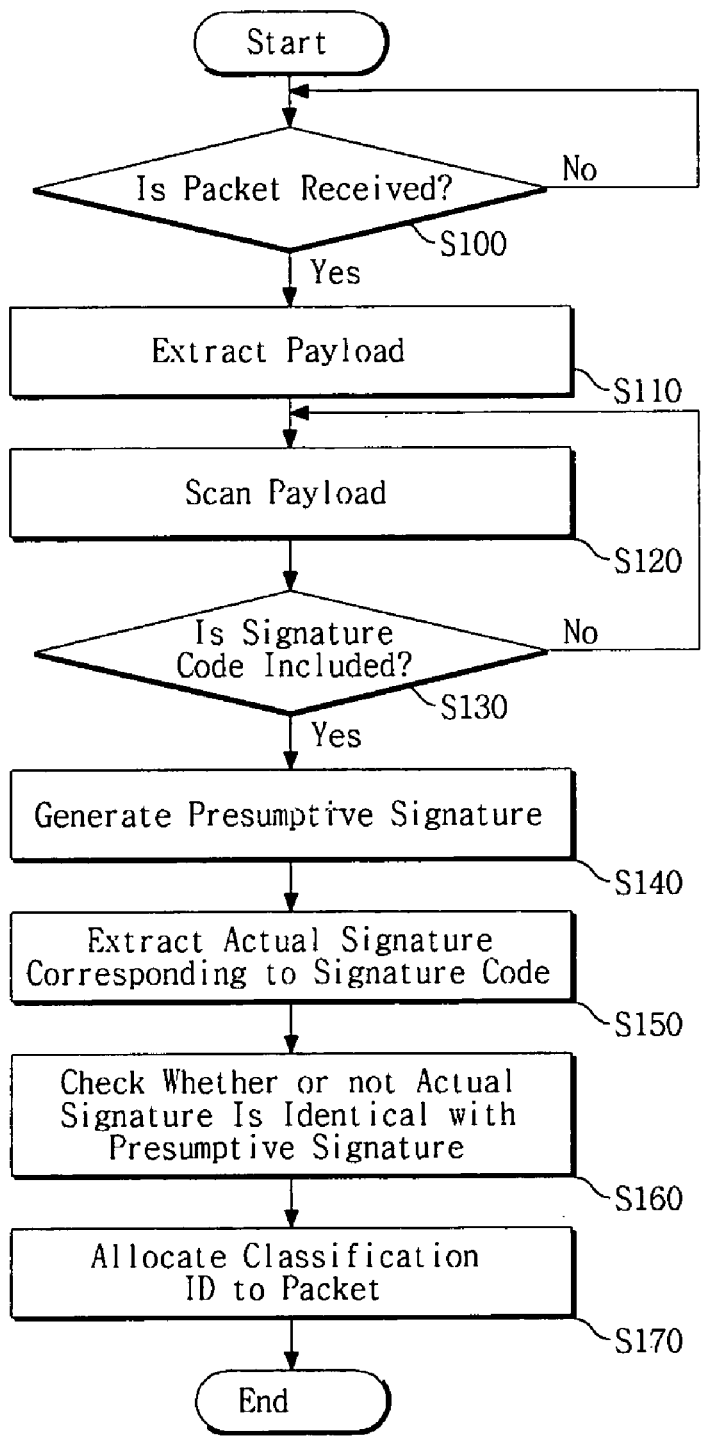
FIG. 1 is a flowchart illustrating a method of classifying packets according to an exemplary embodiment.

FIG. 1 is a flowchart illustrating a method of classifying packets according to an exemplary embodiment.

First, when a packet is received (operation S100), the received packet is parsed to extract a payload from the packet (operation S110). With reference to a header of the received packet, a protocol of the packet is parsed and a starting point of the payload is detected according to the protocol, so that a payload for searching for signature can be extracted. The extracted payload is scanned in order to determine whether or not a previously stored signature code is included in the extracted payload (operation S120).

Figures 2, 3:
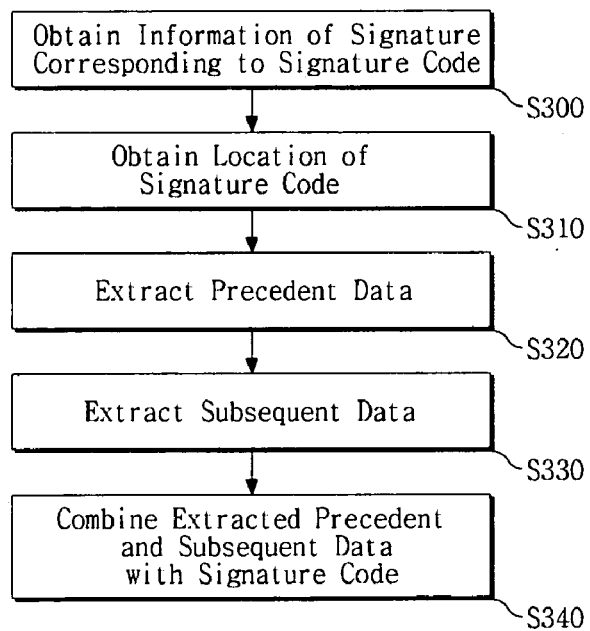
FIG. 2 shows a method for changing channels according to an exemplary embodiment of the present invention.
FIG. 3 is a flowchart illustrating in detail a method of generating a presumptive signature according to an exemplary embodiment.

FIG. 2 illustrates an example of a table showing signature codes of signatures.

As shown in FIG. 2, the signature code is formed by a part of a signature designated for a packet to be classified, and each signature code should be different from one another to identify a corresponding signature. According to the exemplary embodiment, as shown in FIG. 2, a signature code of a signature 'Subject: Re: Incoming Fax' is set as 'ing Fax'. However, the form of a signature code is not limited to the above, and may be set as, for example, 'Incom'. That is, the signature code may be made from a middle part of the signature, prefix or suffix. The signature code is not limited in its contents, length, configuration and format.

According to an exemplary embodiment, in payload scanning, a brute-force algorithm is used. The brute-force algorithm is to identify whether each of characters of the extracted payload is identical with a starting character of the signature code by matching the characters using a byte-sliding method. That is, the brute-force algorithm is to find characters in the payload which are identical with the characters of the signature code by comparing the characters, starting from the beginning of the payload.

Accordingly, the payload scanning for checking whether the signature code is included in the payload can be easily implemented in a hardware manner.

If it is determined by the scanning (operation S120) that the signature code is included in the payload (operation S130), a presumptive signature is generated.

FIG. 3 is a flowchart illustrating in detail a method of generating a presumptive signature according to an exemplary embodiment.

Signature information which corresponds to a signature code included in a payload is obtained (operation S300).

Figures 4, 5:
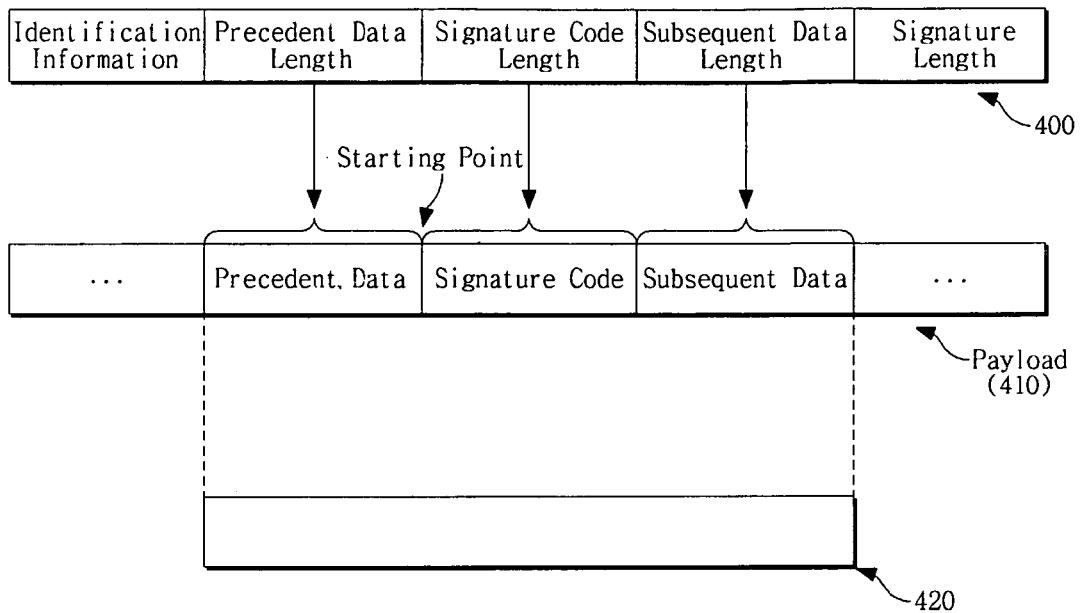
FIG. 4 illustrates an example of a signature configuration table.
FIG. 5 illustrates an example of a signature code table including signature codes and identification information allocated to each signature code.

FIG. 4 illustrates an example of a signature configuration table 400. As shown in FIG. 4, from the signature configuration table 400, information about the configuration of the signature is obtained by use of an identifier number for the signature code as an index. In the exemplary embodiment, the signature configuration table 400 contains length information of the relevant signature and location information indicating where the signature code is placed in the signature. As shown in FIG. 4 in detail, the signature configuration table 400 contains information of a starting point of the signature code in the signature, the length of the signature code, the length of the signature, and the length of precedent data, which precedes the signature code, and the length of subsequent data, which follows the signature code in the payload 410.

A starting point of the signature code in the extracted payload 410 may be detected while the payload is scanned in the operation S120. Based on the length information of the precedent data in the signature configuration table 400, the data precedent to the signature code is extracted from the payload 410 (operation S320). In addition, the subsequent data is extracted from the payload 410 based on the length information of subsequent data (operation S330). The extracted precedent data and subsequent data are combined with the signature code to generate the presumptive signature 420 (operation S340).

An actual signature corresponding to the signature code in the payload 410 is extracted from a previously stored database (operation S150).

FIG. 5 illustrates an example of a signature code table 500 including signature codes and identification information allocated to each signature code. FIG. 6 illustrates an example of a signature table 600 including signatures and identification information allocated to each signature. The signature code and the corresponding signature share the same identification information. That is, the identification information of the signature code in the payload is obtained from the signature code table 500 shown in FIG. 5. Then, the identification information may be used as an index to extract the actual signature from the signature table 600 in FIG. 6. According to the above-described method, there is no need to compare all characters of the signature, which varies in length, with the characters of the payload, thereby reducing time for comparison and increasing the performance.

It is determined whether or not the generated presumptive signature is identical with the extracted actual signature (operation S160). Then, a classification ID (identifier) is allocated to the packet (operation S170). The classification ID is to be allocated to a packet including a predetermined signature. The packet will be processed later according to the classification ID. For example, according to the classification ID, the receipt of a packet may be blocked, the corresponding packet may be forwarded to a particular address, a session of the corresponding network is closed and an email is sent to an administrator, and any other predetermined actions may be conducted.

Figure 7:
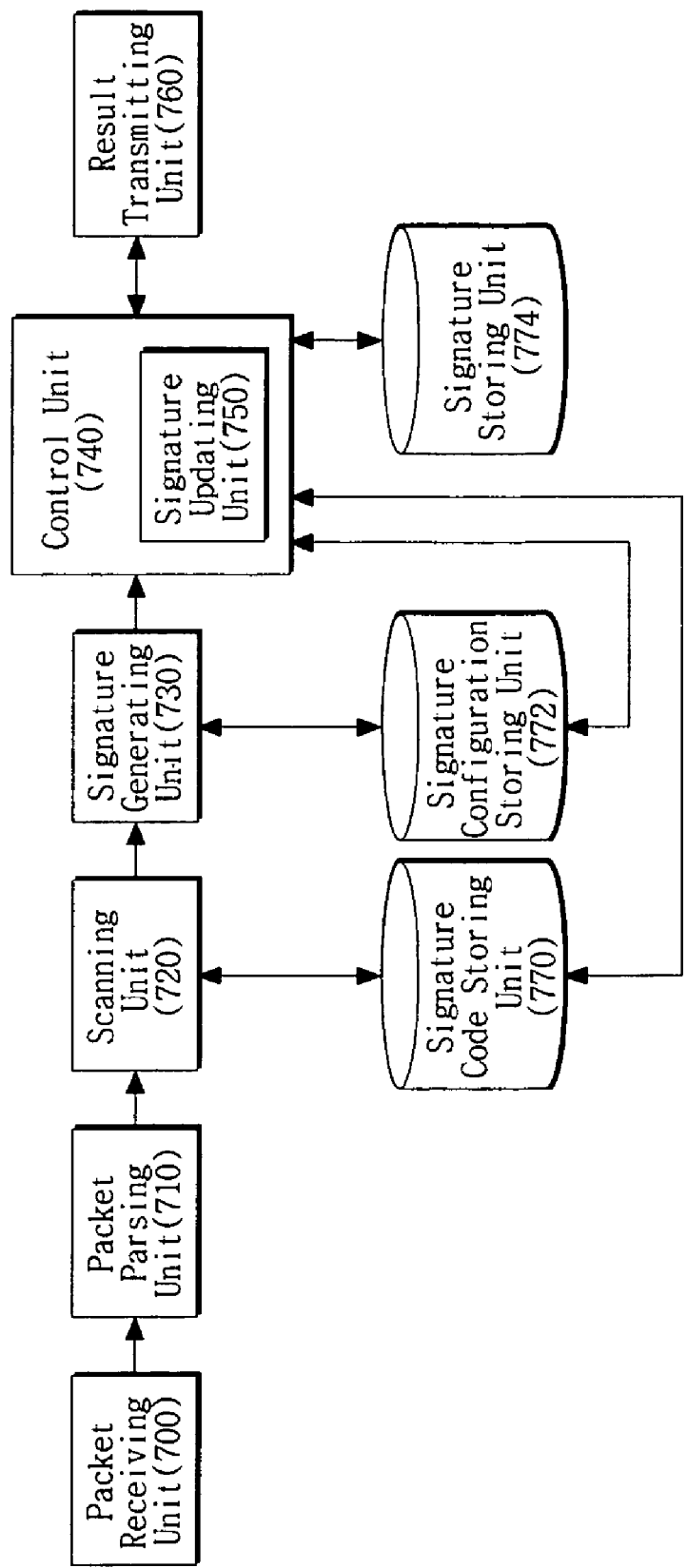
FIG. 7 is a block diagram illustrating an apparatus for classifying packets according to an exemplary embodiment.

FIG. 7 is a block diagram illustrating an apparatus for classifying packets according to an exemplary embodiment.

As illustrated in FIG. 7, the apparatus includes a packet receiving unit 700, a packet parsing unit 710, a signature storing unit 774, a signature code storing unit 770, a scanning unit 720, a signature generating unit 730, and a control unit 740.

The packet receiving unit 700 receives a packet over a network.

The packet parsing unit 710 parses the packet from the packet receiving unit 700 and extracts a payload from the packet. The packet parsing unit 710 parses a protocol of the packet with reference to a header of the received packet, and detects a starting point of a payload based on the protocol to configure the payload for searching for a signature.

The signature storing unit 774 may be implemented as a memory. In the exemplary embodiment, the signature storing unit 774 may be implemented as a signature table that includes signatures included in packets to be classified. The form of storing unit 774 may be preset by an administrator such as a security service provider.

The signature code storing unit 770 stores a signature code table including signature codes, each of which is formed by a part of a signature included in a packet to be classified, for example, for blocking. In the exemplary embodiment, the signature code storing unit 770 may be implemented as a ternary content addressable memory (TCAM). A TCAM is a special type of a memory or storing a routing table for an IP (Internet protocol) address search in a high-speed router or a three-layered switch. A destination address of an input packet and prefixes of all entries stored in the TCAM are compared simultaneously, and an address of the entry that has the longest prefix identical with the destination address is selected. Then, output port information and home address information can be obtained from a forwarding memory which is indicated by the selected address.

The scanning unit 720 receives the extracted payload from the packet parsing unit 710, segments the payload into window-sized packets according to the signature code table in the signature code storing unit 770, and checks whether there is a window-sized packet which is identical with one of the signature codes stored in the signature code storing unit 770. The scanning unit 720 uses a brute-force algorithm for scanning. The brute-force algorithm is to identify whether each of characters of the extracted payload is identical with a starting character of the signature code by matching the characters using a byte-sliding method. That is, the brute-force algorithm is to find characters in the payload which are identical with the characters of the signature code by comparing the characters, starting from the beginning of the payload.

According to the scanning result, the signature generating unit 730 generates a presumptive signature based on the signature code included in the payload. The signature generating unit 730 obtains information of a signature that corresponds to the signature code included in the payload. Additionally, the packet classification apparatus further includes signature configuration storing unit 772. The signature configuration storing unit 772 stores a signature configuration table. Accordingly, the signature generating unit 730 generates the presumptive signature with reference to signature configuration information stored in the signature configuration storing unit 772, according to the signature code included in the payload.

Referring to FIG. 4 again, from the signature configuration table 400, information about the configuration of the signature is obtained by use of an identifier number for the signature code as an index. The signature configuration table 400 includes length information of a signature and location information of where the signature code is placed in the corresponding signature. In addition, as shown in FIG. 4, the signature configuration table 400 further includes information of a starting point of the signature code in the signature, the length of the signature code, the length of the signature, and the length of precedent data, which precedes the signature code, and the length of subsequent data, which follows the signature code in the payload 410.

Based on the signature configuration table 400, the starting point of the signature code in the signature and the location of the signature code in the payload 410 are obtained. Then, the data precedent to the signature code is extracted from the payload 410 based on the length information of the precedent data. Also, the subsequent data on the basis of the signature code is extracted from the payload 410 based on the length information of the subsequent data. The presumptive signature 420 is generated by combining the extracted precedent and subsequent data and the signature code.

The control unit 740 may be implemented as a micro processor. In the exemplary embodiment, the control unit 740 compares the generated presumptive signature with an actual signature corresponding to the signature code and transmits the comparing result to a packet input apparatus.

In detail, the control unit 740 extracts the actual signature corresponding to the signature code from the signature storing unit 774. The signature code and the signature corresponding to the signature code share the same identification information. That is, identification information of the signature code included in the payload is obtained from the signature code table 500 shown in FIG. 5. Then, the obtained identification information is used as an index to extract the actual signature from the signature table 600 shown in FIG. 6.

Then, the control unit 740 checks whether or not the generated presumptive signature is identical with the extracted actual signature by comparing them, and transmits the result to the packet input apparatus over a result transmitting unit 760. Then, the packet input apparatus may drop a corresponding packet and perform other predetermined actions for the packet according to the comparing result.

Moreover, the packet classification apparatus further includes a signature updating unit 750. When a signature which is included in a packet to be blocked is added to the signature storing unit 774, the signature updating unit 750 extracts a signature code corresponding to the added signature and stores the signature code in the signature code storing unit 770. The signature code is set to be a part of a signature included in a packet predetermined to be classified, and each signature code is set to be different from one another for identifying the corresponding signature.

As described above, according to the exemplary embodiment, in signature-based packet detection, signature detection is performed by comparison with respect to a memory. Thus, it is possible to avoid the complexity of comparison that increases with the length and the amount of a signature and the performance degradation due to increase in the number of times of comparison for detecting the signature. As a result, received packets can be classified at high speed, and harmful packets such as aggressive packets that need to be blocked can be identified promptly and accurately.

A packet classification method and a packet classification apparatus in accordance with the exemplary embodiment are applicable to various applications such as security systems in a sense that the method and apparatus identify packets that are possibly harmful to a network and manage packets.

The above-described method of classifying packets can be written as computer programs. Codes and code segments encompassing the program can be easily inferred by a skilled computer programmer in the art. The program can be stored in computer readable media, and read and executed by a computer, thereby implementing a network packet storing method. Examples of the computer readable recording medium include magnetic storage media, optical recording media, and storage media such as carrier waves.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of classifying received packets in a security system, the method comprising:
   parsing a received packet and extracting a payload from the parsed packet;
   scanning the payload to check whether or not a predetermined signature code is included in the payload;
   if it is determined from a result of the scanning that the predetermined signature code is included in the payload, generating a presumptive signature based on signature information corresponding to the predetermined signature code;
   extracting an actual signature corresponding to the predetermined signature code from a predetermined signature table; and
   determining whether or not the generated presumptive signature is identical with the actual signature corresponding to the predetermined signature code, and allocating a classification identifier (ID) to the received packet according to a result of the determination whether or not the generated presumptive signature is identical, thereby classifying the received packet according to the classification ID, wherein the predetermined signature code is formed by a part of the signature information corresponding to the predetermined signature code;
   wherein identification information is set for each predetermined signature code, and the generating of the presumptive signature comprises:
      obtaining configuration and size information of the signature information corresponding to the predetermined signature code from pre-stored information based on the identification information of the predetermined signature code, wherein the configuration information of the signature information includes a starting point of the predetermined signature code in the signature information, a length of the predetermined signature code, a length of precedent data which precedes the predetermined signature code, and a length of subsequent data that follows the predetermined signature code;
      extracting the precedent data from the payload based on the precedent data length information;
      extracting the subsequent data from the payload based on the subsequent data length information; and
      generating the presumptive signature by combining the extracted precedent data, the predetermined signature code, and the extracted subsequent data.

2. The method of claim 1, further comprising:
   extracting a part of each actual signature by which the actual signature is identified from other actual signatures; and
   setting the extracted part as a predetermined signature code of the actual signature and storing the predetermined signature code.

3. The method of claim 1, wherein the parsing of the received packet and the extracting of the payload comprises parsing the payload of the received packet with reference to a protocol included in a header file of the received packet.

4. The method of claim 1, wherein the determining of whether or not the generated presumptive signature is identical with the actual signature corresponding to the predetermined signature code comprises detecting the actual signature corresponding to the predetermined signature code from pre-stored signatures by use of the identification information allocated to the predetermined signature code as an index.

5. The method of claim 1, wherein the scanning of the payload is performed according to a brute-force algorithm.

6. An apparatus for classifying received packets, comprising:
   a signature storing unit storing pre-set signatures;
   a signature code storing unit storing a plurality of signature codes, each of which is formed by a part of the stored pre-set signatures, the plurality of signature codes being differentiated from one another in accordance with the stored pre-set signatures;
   a scanning unit scanning a payload extracted from a received packet to check whether any one of the stored signature codes is included in the payload;
   a processor; and
   a memory storing computer executable instructions that, when executed by the processor, cause the processor to perform the steps of:
      generating a presumptive signature based on signature information corresponding to a signature code included in the payload, according to a result of the scanning; and
      extracting, from the signature storing unit, an actual signature corresponding to the signature code included in the payload;
      comparing the presumptive signature with the actual signature corresponding to the signature code included in the payload;
      allocating a classification identifier (ID) to the received packet according to a result of the comparison; and
   a signature configuration storing unit storing configuration and size information of the signature information corresponding to the signature code and identification information of the signature code, wherein the configuration information of the signature information includes a starting point of the signature code in the signature information, a length of the signature code, a length of precedent data which precedes the signature code, and a length of subsequent data that follows the signature code;

wherein the computer executable instructions that, when executed by the processor, cause the processor to generate the presumptive signature comprise computer executable instructions that, when executed by the processor, cause the processor to perform the steps of:

obtaining from the signature configuration storing unit the configuration and size information of the signature information corresponding to the signature code included in the payload based the identification information of the signature code; extracting the precedent data from the payload based on the precedent data length information;

extracting the subsequent data from the payload based on the subsequent data length information; and generating the presumptive signature by combining the extracted precedent data, the signature code, and the extracted subsequent data.

7. The apparatus of claim 6, wherein the memory stores computer executable instructions that, when executed by the processor, cause the processor to perform the steps of:

extracting a signature code from a signature included in a packet that is to be classified; and storing the extracted signature code in the signature code storing unit.

8. The apparatus of claim 6, wherein the memory stores computer executable instructions that, when executed by the processor, cause the processor to perform the steps of:

parsing a protocol of the received packet with reference to a header file of the received packet; and obtaining information of a starting point of the payload in the received packet.

9. The apparatus of claim 6, wherein the computer executable instructions that, when executed by the processor, cause the processor to extract the signature information corresponding to the signature code from the signature storing unit use the identification information allocated to the signature code as an index.

10. The apparatus of claim 6, wherein the scanning unit scans the payload according to a brute-force algorithm.

* * * * *